May 7, 1974  R. N. BALLUFF ET AL  3,809,539

DOWNFLOW CATALYTIC CONVERTER FOR ENGINE EXHAUST GASES

Filed March 13, 1972  4 Sheets-Sheet 1

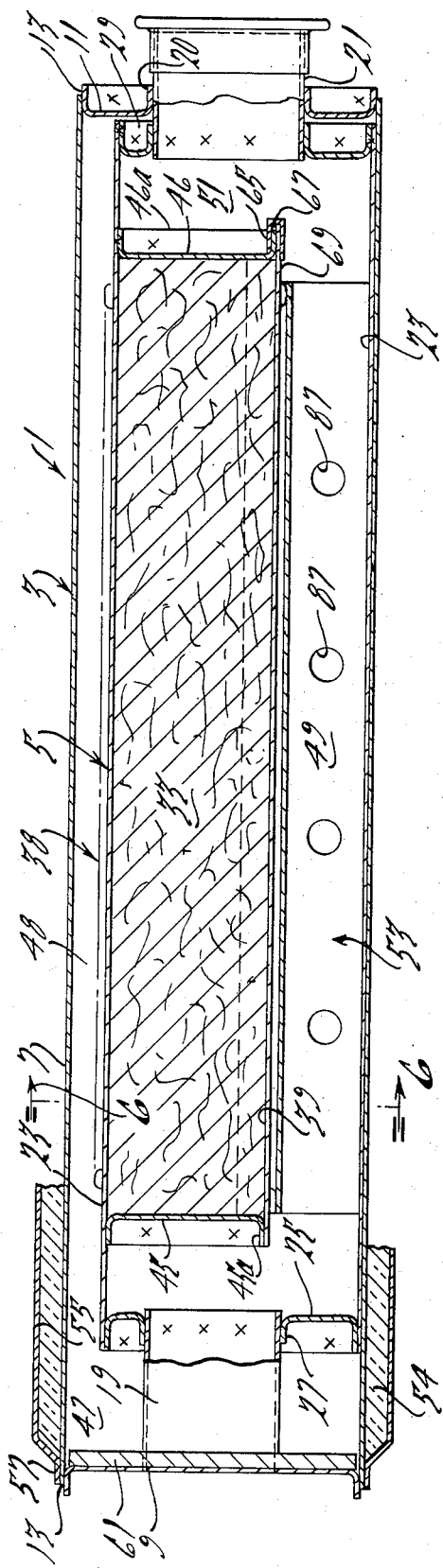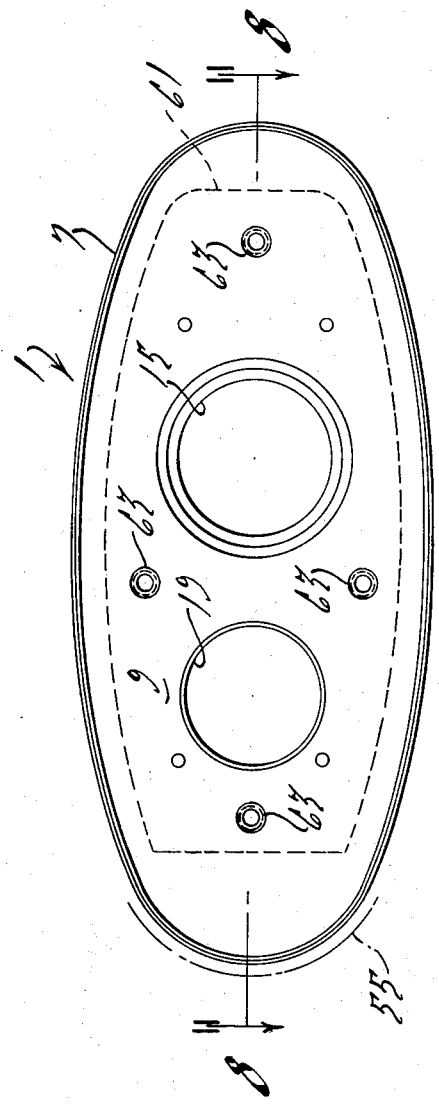

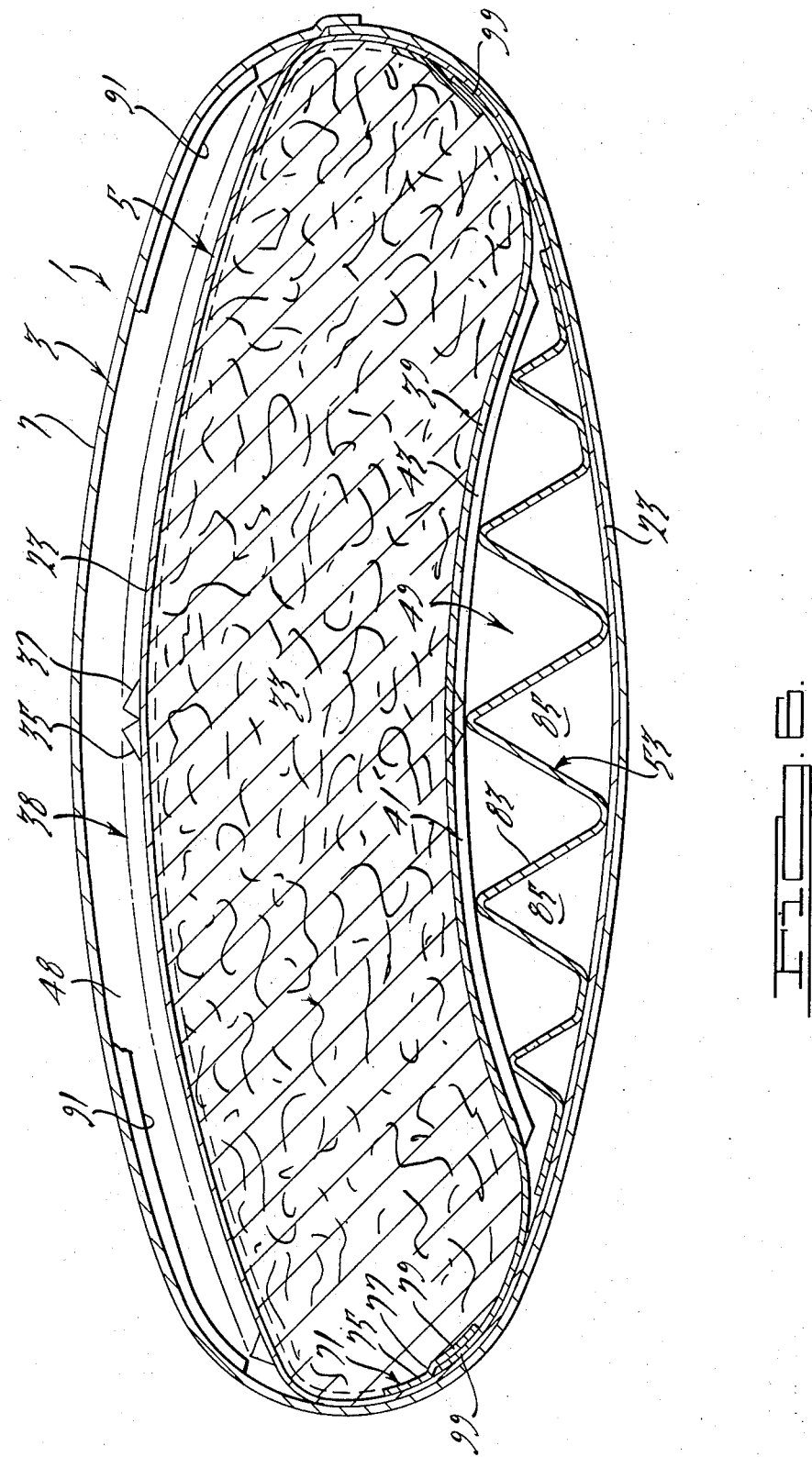

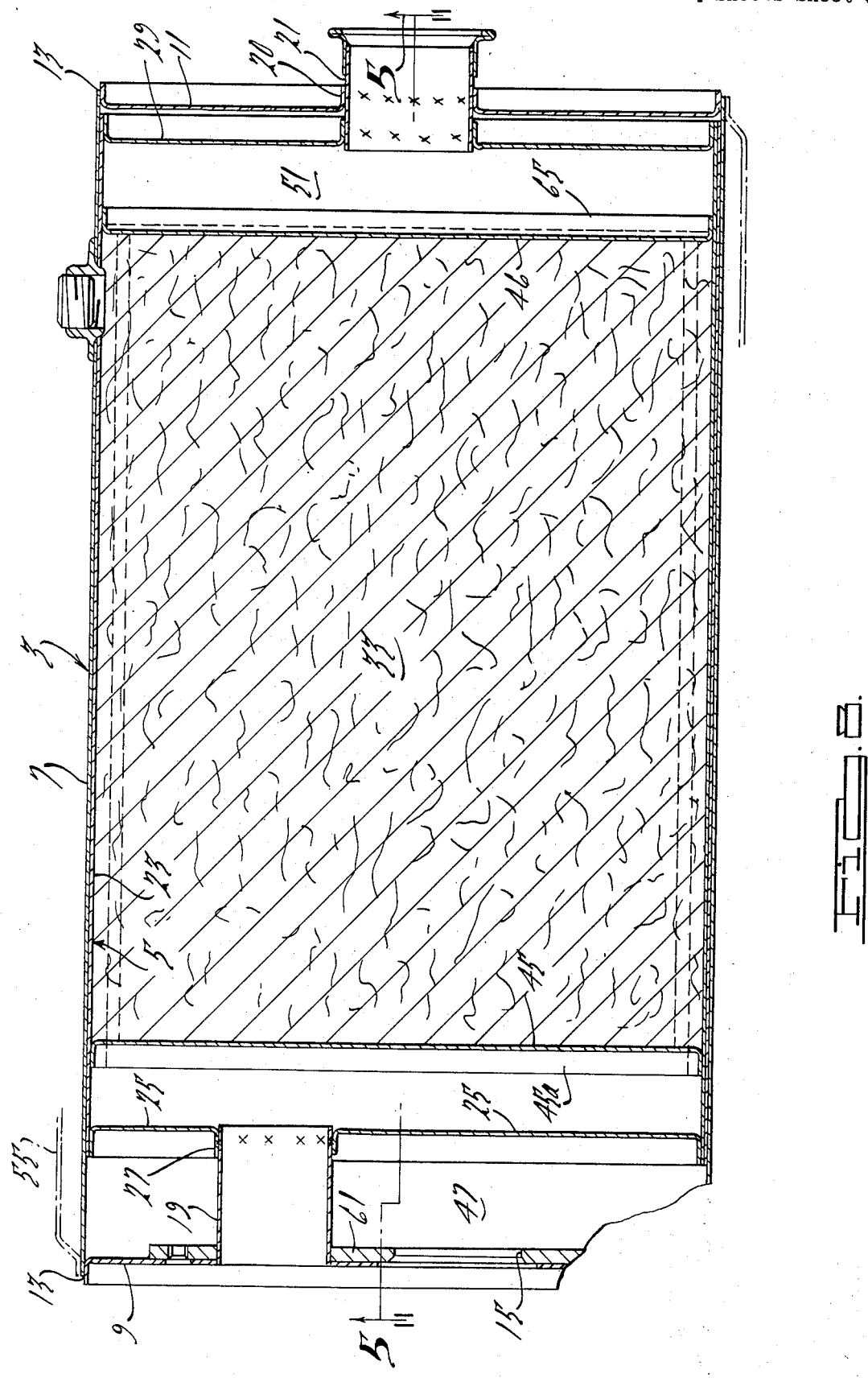

United States Patent Office 3,809,539
Patented May 7, 1974

3,809,539
DOWNFLOW CATALYTIC CONVERTER FOR
ENGINE EXHAUST GASES
Robert N. Balluff, Rives Junction, and James D. Stormont, Grass Lake, Mich., assignors to Tenneco Inc., Racine, Wis.
Filed Mar. 13, 1972, Ser. No. 234,009
Int. Cl. B01j 9/04; F01n 3/14
U.S. Cl. 23—288 F                                  30 Claims

ABSTRACT OF THE DISCLOSURE

A catalyst converter for an internal combustion engine exhaust system has a curved downflow catalyst bed in which the inlet wall is provided by a portion of a cylindrical shell inside an outer housing and the outlet wall is provided by a similarly curved plate carried by the shell, there being slip connections to permit relative heat expansion and contraction of the parts.

BACKGROUND OF THE INVENTION

One of the major problems in the design of catalyst converter structures for engine exhaust systems is to successfully negate in a practical manner the effects of the large temperature variations and differentials to which the structure is subjected. The temperature varies from ambient to 1600° F. or more and during operation some parts of the converter may be at 500° F. or lower and others at 1600° F. or higher. Obviously, the stresses that can be created by differences in temperature of this order are tremendous and are capable of easily causing rupture of joints and distortion of critical parts to the extent that the converter ceases to function as a useful emission conversion device. The problem is compounded in the motor vehicle field by the further requirements that the converter be reasonably low in cost, be capable of mass manufacture, have a long, efficient, trouble-free life, and be of a size and shape that permits it to be easily installed in the very restricted spaces available beneath the frames of modern automobiles.

BRIEF SUMMARY OF THE INVENTION

It is the purpose of this invention to provide a downflow catalyst converter structure that substantially avoids the harmful effects of large temperature differences and substantially meets the requirements mentioned above.

The converter structure of the invention is similar in many respects to that of exhaust gas mufflers used in the automotive industry. Thus, many of the mass manufacturing techniques and much of the capital equipment used in the past to make mufflers can be employed in its manufacture to thereby provide for reasonably low cost, large volume manufacture. The size and shape of the present structure are also comparable to that of large exhaust mufflers so that it may, with a minimum number of other adjustments, be installed in place of an exhaust muffler where it will serve to attenuate sound, and therefore, to a significant extent, substitute for the muffler. Further, the ratio of catalyst bed volume to total converter volume is high to give a minimum size unit.

Since the present converter incorporates means to minimize the bad effects of high temperatures and large temperature differences and utilizes an efficient downflow type bed along with flow equalizing means, it substantially meets the requirement as to long, effective, trouble-free operation. The anti-temperature effect means of the invention includes various slip joints to absorb the stress of temperature changes and differentials. Of prime importance, however, is a unique catalyst bed structure which features a downwardly curved shape on both its inlet and outlet faces. As will become apparent, this shape itself tends to overcome, to some degree, the adverse effect of the large temperature difference between the inlet and outlet sides of the bed. This temperature effect is further offset by forming the bed of two relatively movable parts that are shaped in such a way that one supports the other, and joints around the bed to serve as possible leakage points are substantially eliminated. The bed structure gives design control of the expansion and contraction of the walls and of the bed volume so that the temperature effect can be largely neutralized in the design stage. Temperature control in the exhaust system by means of a catalyst bed bypass arrangement is accommodated, if desired, by the converter structure of the invention and the bypass control device may be located either upstream or downstream of the bed.

The invention includes other important features, such as a housing within a housing structure and means for optimizing the flow patterns through the converter, which will be described in detail hereinafter.

DESCRIPTION OF THE DRAWINGS

In the drawings the solid flow lines indicate the path followed by gas in flowing through the catalyst bed and the broken flow lines indicate bypass flow. Also, the x's indicate welds.

FIG. 5 is a longitudinal cross section taken along the line 5—5 of FIG. 8 of a converter like that of FIG. 1 but showing more structural details, the broken phantom lines showing an insulating outer wrap in this figure and in FIGS. 6 and 7;

FIG. 6 is a transverse cross section along the line 6—6 of FIG. 5;

FIG. 7 is an end elevation taken from the left or inlet end of the converter of FIG. 5; and FIG. 8 is a longitudinal section along the line 8—8 of FIG. 7.

DESCRIPTION OF THE INVENTION

Figure 1:
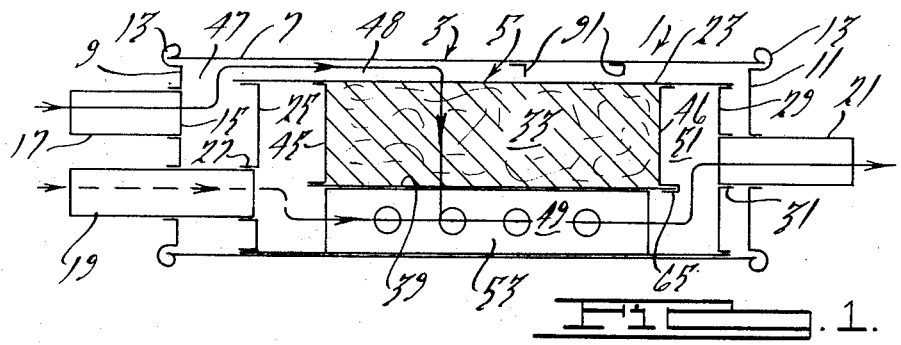
FIG. 1 is a schematic longitudinal cross section through a converter embodying the invention for use with a bypass control device (not shown) located upstream of the converter.

The converter 1 of FIGS. 1 and 4 through 8 has a tubular converter housing 3 and a tubular catalyst housing 5 located inside of the converter housing 3. The converter housing comprises an oval shaped shell 7 that has an inlet header 9 and an outlet header 11, each of which are securely connected in a fluid tight joint 13 with the ends of the shell 7. The inlet header 9 has a round inlet opening 15 which may be in the form of a bushing 17, as shown in FIG. 1, or a simple hole as shown in FIG. 8. The inlet header 9 also supports a round bushing 19 which forms the inlet for bypass flow of the gas around the outside of catalyst housing 5 as will be described hereinafter. The neck 20 of outlet header 11 provides a slip fit support for an outlet bushing 21 that enables gas to flow out of the converter 1 into a tailpipe (not shown).

Figure 4:
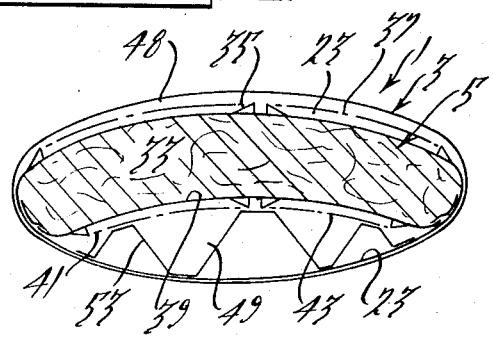
FIG. 4 is a transverse cross section through the catalyst bed and outer housing of any of the converters of FIGS. 1–3.

The inner catalyst containing housing 5 has a special type oval outer shell 23 of a shape best seen in FIGS. 4 and 6. The shell 23 has an inlet header 25 that closes its upstream end but is provided with a neck 27 to support the inner end of the bypass bushing 19. The shell 23 also has an outlet header 29 which is closed except for a neck 31 to which is spotwelded the inner end of the outlet bushing 21.

The confined chamber or catalyst particle bed 33 (which is filled with suitable particulate catalyst material) is of constant thickness and provided, in part, by a major part of the upper half of the inner housing shell 23. This shell part has opposing banks of louvers 35 and 37 (FIGS. 4 and 6) formed in it so that it is, in effect, the upper grid 38 of the bed 33. The lower outlet wall of the bed 33 is provided by a perforated plate or grid 39 which also has opposing sets of louvers 41 and 43 formed in it. The louvers are, of course, sized to prevent escape of the catalyst particles and their arrangement tends to inhibit whirling and excessive turbulence of the gas in the bed and to thereby minimize catalyst attrition. The longitudinal ends of the catalyst bed are closed by partitions 45 and 46 at the upstream and downstream ends, respectively. The partition 45 is spaced downstream from the partition 25 and the outlet of the bypass bushing 19, while the downstream partition 46 is spaced upstream from the inlet to the outlet bushing 21 and partition 29.

In operation of the structure of converter 1 of FIGS. 1 and 4 to 8 as briefly described, the stream of exhaust gas to be treated enters the inlet 15 and flows into an inlet chamber 47 that is located within housing 3 and outside of the housing 5. The stream enters a longitudinally extending space 48 along the top of the shell 23 and the gas passes downwardly through louver patches 35 or 37 in inlet wall 38 into and through the catalyst bed 33. The catalyst particles in the bed 33 are of suitable chemical composition to cause conversion of harmful constituents in the exhaust gas, normally carbon monoxide, unburned hydrocarbons, and/or nitrogen oxides. The gas flowing through the bed 33 leaves the bed by way of louver patches 41 and 43 in the bottom grid 39 and enters a longitudinally directed chamber 49 that extends from one end to the other of the bottom of the housing 5. The gas can, therefore, flow to an outlet chamber 51 in the housing 5 that is adjacent the inlet to the outlet bushing 21. It will be seen that if suitable controls are actuated to cause flow through the bypass tube 19, the bypassed gas will also flow into chamber 49 and then to chamber 51 and out of the converter through bushing 21 without passing through the bed 33.

If desired for added support of the lower bed plate 39 and for flow control through the chamber 49, a zig zag perforated sheet member 53 may be disposed in the chamber 49 so that one side engages the bottom of the lower grid 39 and the other side engages the bottom of the shell 23. The member 53 may be welded to shell 23 but is not fastened to grid 39.

Figure 2:
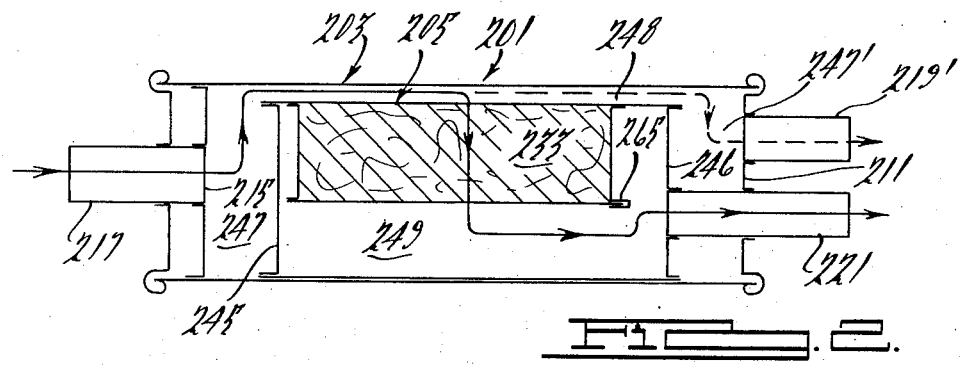
FIG. 2 is a view similar to FIG. 1 but shows a modified converter structure for use in an exhaust system where the bypass control device (not shown) is downstream of the converter.
Figure 3:
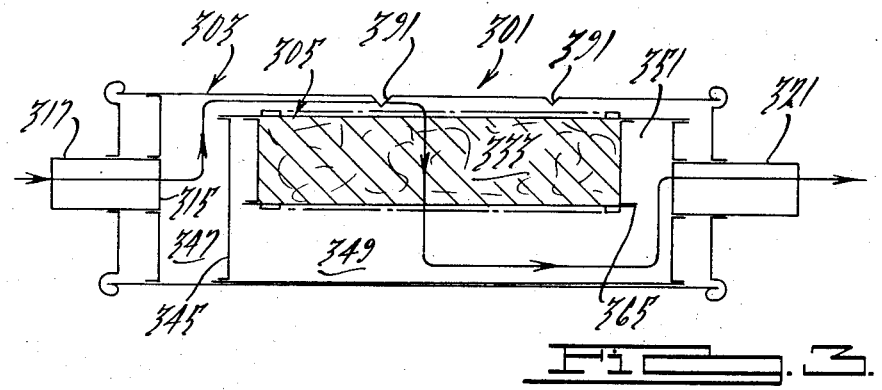
FIG. 3 is a view similar to FIGS. 1 and 2 of a modified converter structure that omits the bypass structure.

The converters 201 and 301 of FIGS. 2 and 3 are basically the same as the converter 1. In the drawings, parts like those in the converter 1 are given the same reference numerals but in the 200 or 300 series, respectively. In the converter 201, the bypass is at the outlet end of the converter rather than at the inlet end as in converter 1; and in converter 301, the bypass is eliminated entirely. It will be understood that in converters 201 and 301 the structure of the catalyst beds 233 and 333, respectively, are substantially the same as that which has been described and will be further desribed in connection with the bed 33. In FIG. 2, 247' is the outlet chamber for gas that has bypassed bed 233 which is fed by passage 248 and which empties into bypass bushing 219'.

Referring now in more detail to the structure of the converter 1 as revealed in FIGS. 5 through 8, the unit may be insulated, if desired, by wrapping a layer 54 of suitable material, such as asbestos, around all or a selected part of the shell 3 and holding it in place by means of an external metal cover 55 which is turned down at its ends 57 where it may be secured by welding, etc. to the joints 13. The inlet header 9 which is formed of relatively thin bendable metal is preferably reinforced by a pad 61 which is attached to it in a suitable manner, such as welding. The pad has threaded apertures 63 which are aligned with openings in the header 9 and serve as a means of attachment for an inlet casting (not shown) which may include valve structure for directing flow into the bypass tube 19 under certain operating conditions, such as overheating. The bypass bushing 19 is supported by way of a slip fit in a suitable opening in the pad 61 as well as in the neck 27 of the partition 25 to which it is spotwelded. With this arrangement of the bypass tube 19, the catalyst bed housing 5 is able to move longitudinally within the outer housing 3 because the bypass tube can slip in the inlet header structure of the outer housing. At the outlet end, the outlet bushing 21 may be spotwelded to the header 11 for the outer housing (FIG. 8), as well as to the header 29 for the catalyst bed housing, so that the downstream end of the housing 5 is anchored in longitudinal position within the housing 3. The spotweld connection of both the inner and outer housings 5 and 3 to the common outlet bushing 21 forms the only rigid connection between the two housings and they are otherwise capable of expanding and contracting relative to each other. It will be appreciated that various other specific ways of achieving a one point connection between the two housings are possible. For example, the connection could be at the inlet end only or bushing 19 could be welded to pad 61 and slip in neck 27, etc.

The inlet and outlet headers 25 and 29 for the inner housing 5 are, as indicated by the $x$'s in the drawings, spotwelded to the respective downstream ends of the inner shell 23 by way of their circumferential outer flanges. The header 45 at the upstream end of the catalyst bed 33 has a circumferential flange 45a which is spotwelded to the shell 23 on its upper side and to the grid 39 on its lower side to close the upstream end of the bed 33. The downstream header 46 is spotwelded to the shell 23 by way of its circumferential flange 46a, but has a slip fit with the lower bed support member 39. This is provided by means of a U-shaped retainer 65 which has one leg spotwelded to the flange 46a and the other leg spaced below such flange to provide a slot 67 to slidably receive an end section 69 of the member 39. The slip fit of the lower bed support member 39 with respect to the shell 23 extends for the entire length of the upper bed support 23 except for the spotweld attachment to the partition 45. The member 39 is held in place along its side edges by means of longitudinally extending retainer strips 71 and 73 which are curved to fit against the insides of the shell 23 to which they are spotwelded along the upper sections 75. The retainers 71 and 73 are offset at 77 so that their lower sections 79 are spaced from the wall of the shell 23 a distance which is just slightly greater than the thickness of the member 39. The outer longitudinal edges of the member 39 are received in the spaces provided by the offsets 79 and are, therefore, held transversely in place while being capable of movement relative to the member 23. In this manner, the differing amounts of longitudinal or transverse expansion of the upper and lower catalyst bed supports are readily accommodated. The strips 71 and 73 are preferably located vertically in the positions shown so that the edges of the lower grid are locked in below center with respect to the midplane of the bed.

The concave shape of the catalyst bed 33 and, in particular, of the lower bed support 39 which is subjected to the higher temperature, provides an inherent resistance to permanent deformation even at elevated temperatures. However, further support may be supplied by means of the corrugated or zig zag shaped support member 53 as seen best in FIGS. 5 and 6. This member has a plurality of walls 83 which define longitudinally extending channels 85 that help to stabilize flow along the underside of the bed 33 in chamber 49. Openings 87 in the walls of the member 53 provide for equalization of gas pressure and flow across the bottom of the bed in passage 49.

Flow equalization in the passage 48 across the top of the bed 33 may be desired and can be provided by means of angle shaped fins 91 which can be welded to the shell 7 or by indentations 391 in the wall of the shell 7 as seen in FIG. 3. These devices extend transversely across an arc that is substantially the same as the arc subtended by louvers 35 and 37. There are preferably a plurality of fins 91 of differing depths to provide a controlled longitudinal flow distribution of gas entering the bed.

Catalyst may be removed from and added to the bed 33 through a threaded plug closed filler tube 95 (FIG. 8). If used it is located near the plane of weld connection in the housings 3 and 5 so as not to inhibit relative expansion and contraction.

In operation, gas enters the inlet chamber 47 by way of an inlet tube 17 or the inlet opening 15 and flows through the passage 48 which extends longitudinally of the converter 1. The gas then turns at right angles and flows downwardly through the catalyst filled bed 33, fins 91 or the equivalent providing for substantially uniform distribution of flow along the length of the bed. Secondary air, if needed, may be introduced into the gas at any point prior to entry into the bed 33. In passing through the bed 33, where undesired constituents of the exhaust gas are removed, heat is released and this lowers the strength of the metal forming the bed 33. Since the outlet side of the bed runs hotter than the inlet side the loss of strength affects particularly the lower bed support 39. The shape of the lower grid member 39, plus the vertical support given to it on opposite longitudinal side edges by the upwardly curved wall sections of the converter as seen at 99, inhibit deformation of the lower bed support 39 and support is in both vertical and transverse directions further increased by use of the support members 53 and strips 71 and 73.

Gases leaving the bed member 39 through the louver banks 41 and 43 flow into the longitudinally extending passage 49 inside of the housing 5 and then downstream to the outlet chamber 51 from which they can leave the converter by way of the outlet bushing 21. In the event that the bypass mechanism is actuated, incoming gas flows through the bypass inlet tube 19 directly into the housing 5 and the passage 49 to flow along the bottom side of the bed 33 and into the outlet bushing 21.

In the converter 201 of FIG. 2, the operation is very similar to that just described in connection with the converter 1. However, the structure seen at the inlet end of the converter 1 is found at the outlet end of the converter 201, along with the change of the outlet end of the converter 1 to the inlet end of the converter 201. In the converter 201, bypass gas will flow along the upper side of the bed via passage 248 to an outlet chamber 247' and then into the outlet bypass tube 219'. Gas passing through the bed 233 follows the longitudinally extending outlet passage 249 into the outlet bushing 221 that is supported in the headers 246 and 211.

In connection with converter 301 of FIG. 3, the operation is apparent in view of the previous descriptions. The operation is simplified since this structure omits the bypass tube arrangement altogether and all gas flowing through the unit flows through the catalyst bed 333.

Attention has been directed above to the important stress minimizing, slip-fit structure of converters embodying the invention that serves as a means to overcome the effects of temperature differentials within the converter. An equally important antitemperature effect feature of the invention resides in the curved segmental shape of the bed 33 and that of the upper and lower bed forming grids 38 and 39. The grids, and hence the bed 33, are curved downwardly in the direction of flow through them so that the grids present convex faces to the gas. The grids, and hence the bed 33, are preferably substantially concentric with the upper wall of the shell 7 as can be seen in FIGS. 4 and 6.

The bed shape of the invention provides several advantages. By curving the upper and lower grids in the same direction and making them concentric with the shell, a constant bed thickness is obtained to provide optimum flow and temperature distribution throughout the bed and optimum utilization of the catalyst material as well as a constant cross-section for the inlet passage 48 to give optimum pre-bed flow distribution. Further, the use of the curved bed with a similarly curved shell gives a high ratio of catalyst bed volume to volume of the housing 3, thereby giving maximum utilization of space occupied by the converter 1.

In addition, the curvature of the grids 38 and 39 adds strength to them as compared with flat plates and tends to uniformly distribute and control thermal expansion and contraction and thereby alleviate wrinkling. Normally, the lower grid of a down flow catalyst bed will be at a materially higher temperature than the upper grid—about 300° to 900° F. hotter. In the present design, the lower grid 39 has a shorter arc length than the upper grid 38 and this tends to partially offset or equalize the total expansion of each grid. The shell 23 and the lower grid 39, being separate parts, can be made of different metals and by appropriate selection of coefficients of thermal expansion, a desired characteristic relationship between the bed volume and temperature can be achieved. For example, it would be possible to maintain substantially a constant bed volume, or a slightly decreasing bed volume to exert slight pressure on the catalyst, or even, conversely, an increasing bed volume with increase in temperature. That this is possible is apparent from the fact that the volume of the bed 33 is a function of the difference in total thermal expansion (or contraction) between the upper grid and the lower grid and that, in turn, is a function of the coefficient of thermal expansion, multiplied by the change in temperature and by the length or width of the grid. Thus, the invention provides a means for control of the thermal contraction and expansion of the walls of the catalyst bed and of the volume of the bed.

It has been already indicated that the curved shape of the bed 33 with the particular structure disclosed, enables the shell 23 to provide support along the side areas 99 that helps resist vertical distortion of the hotter lower grid 39.

Use of the shell 23 to form the upper grid and the total catalyst bed housing 5 by means of one contiguous piece of metal eliminates the need for special gas sealing techniques normally required with conventional structure. It lends itself to ease of construction by means of conventional equipment and metal shaping and securing techniques already used in the exhaust gas muffler industry. The shell 23 and parts attached to it can be made as a subassembly to facilitate manufacturing. The arrangement shown also permits the inlets and outlets for the converter 1 to be round and to be located in various positions with respect to the axis of the converter 1 in order to suit the particular installation for which the converter is intended.

The curved shape of the bed absorbs thermal expansion and contraction in the transverse direction while the slip fit structure absorbs expansion and contraction in the longitudinal direction. Since the housing structure 5 is attached to the outer housing 3 at one end only with the shell 23 being otherwise in a slipping engagement with the shell 7, the hotter housing 5 can move longitudinally within the housing 3. Within the housing 5, the lower grid 39 is fixed to the shell 23 at one end only and is in slipping engagement with the shell 23 otherwise. Thus, the lower grid, which is hotter, can move longitudinally with respect to the upper grid 38 and the shell 23.

It is possible, broadly, to minimize or eliminate the use of slip connections while retaining many advantages of the present invention, in which case the grids 38 and 39 should be dish-shaped instead of cylindrical to accommodate longitudinal expansion and contraction. Other modifications in the specific structure shown may be made without departing from the spirit and scope of the invention.

It is understood that any suitable and desired type or form of catalyst material may be supported within the bed structure 33 though the structure is particularly suitable for pellets or particles of catalyst of a desired chemical composition. Also, the respective flow areas and hole patterns for the inlet and outlet grids 38 and 39 may be varied to obtain various desired pressure and flow distribution patterns.

What is claimed is:

1. A downflow catalyst converter for engine exhaust gases comprising an elongated cylindrical outer housing of oval cross section having a longitudinal axis and inlet means and outlet means for a gas stream to be treated, downflow catalyst bed means providing a catalyst bed in said housing and having a perforate inlet wall and a perforate outlet wall, gas to be treated flowing from the inlet wall to the outlet wall through the catalyst bed, inlet gas passage means in the housing for passage of gas from said inlet means to said inlet wall, outlet gas passage means in the housing for passage of gas from said outlet wall to said outlet means, said bed being shaped as a curved cylindrical segment extending across substantially the entire major diameter of said oval housing, the inlet and outlet walls of said bed both being curved transversely with respect to said longitudinal axis to present convex curvature to gas impinging on them from the inlet gas passage means and the catalyst bed respectively, the transverse length of said bed being less than that of a semi circle through the bed that has substantially the same radius and center as said outlet wall.

2. A converter as set forth in claim 1 wherein the curved transverse length of the inlet wall is greater than the curved transverse length of the outlet wall.

3. A converter as set forth in claim 1 wherein the inlet and outlet walls are substantially concentric with a portion of said housing adjacent the inlet wall, there being a longitudinal space between said inlet wall and said housing portion and said space forming a major part of said inlet passage means.

4. A converter as set forth in claim 3 including fin means associated with said housing portion and extending into said longitudinal space and providing means tending to equalize flow from the inlet passage means through the inlet wall.

5. A catalyst converter for engine exhaust gases comprising an oval outer housing having inlet means and outlet means for a gas stream to be treated, catalyst bed means providing a catalyst bed in said housing and having a perforate inlet wall and a perforate outlet wall, gas to be treated flowing from the inlet wall to the outlet wall through the catalyst bed, inlet gas passage means in the housing for passage of gas from said inlet means to said inlet wall, outlet gas passage means in the housing for passage of gas from said outlet wall to said outlet means, said bed being shaped as a curved segment extending across substantially the entire major diameter of said oval housing and the inlet and outlet walls thereof of both being curved to present convex curvature to gas impinging on them from the inlet gas passage means and the catalyst bed respectively, one curved half of each of said walls having a patch of louvers formed therein facing in one direction and the other curved half of each of said walls having a patch of louvers formed therein facing in the opposite direction.

6. A catalyst converter for engine exhaust gases comprising an oval outer housing having inlet means and outlet means for a gas stream to be treated, catalyst bed means providing a catalyst bed in said housing and having a perforate inlet wall and a perforate outlet wall, gas to be treated flowing from the inlet wall to the outlet wall through the catalyst bed, inlet gas passage means in the housing for passage of gas from said inlet means to said inlet wall, outlet gas passage means in the housing for passage of gas from said outlet wall to said outlet means, said bed being shaped as a curved segment extending across substantially the entire major diameter of said oval housing and the inlet and outlet walls thereof both being curved to present convex curvature to gas impinging on them from the inlet gas passage means and the catalyst bed respectively, said inlet wall having inwardly curved longitudinal side portions and said outlet wall comprising a member separate from the inlet wall and having curved longitudinal side portions fitting inside of and supported by the side portions of the inlet wall.

7. A converter as set forth in claim 6 wherein the side portions of the inlet and outlet walls have slip-fits with each other.

8. A converter as set forth in claim 7 wherein said slip-fits provide for relative movement between the walls in a longitudinal direction and in a transverse direction.

9. A converter as set forth in claim 8 including retaining strips secured to the longitudinal side portions of the inlet wall and acting with said inlet wall side portions to provide longitudinal retaining grooves, said outlet wall having longitudinal side edge portions received in said retaining grooves.

10. A converter as set forth in claim 9 including an inner oval annular shell inside said housing, a portion of said shell providing said inlet wall and another portion of said shell being spaced from and coextensive with said outlet wall and defining with said outlet wall a major part of said outlet gas passage means.

11. A converter as set forth in claim 10 including means securing said oval shell to said housing at one end only to provide for dimensional changes due to thermal differentials of the shell transversely and along its length with respect to the housing.

12. A catalyst converter for engine exhaust gases comprising an oval outer housing having inlet means and outlet means for a gas stream to be treated, catalyst bed means providing a catalyst bed in said housing and having a perforate inlet wall and a perforate outlet wall, gas to be treated flowing from the inlet wall to the outlet wall through the catalyst bed, inlet gas passage means in the housing for passage of gas from said inlet means to said inlet wall, outlet gas passage means in the housing for passage of gas from said outlet wall to said outlet means, said bed being shaped as a curved segment extending across substantially the entire major diameter of said oval housing and the inlet and outlet walls thereof both being curved to present convex curvature to gas impinging on them from the inlet gas passage means and the catalyst bed respectively, an inner oval annular shell inside said housing, a portion of said shell providing said inlet wall and another portion of said shell being spaced from and coextensive with said outlet wall and defining with said outlet wall a major part of said outlet gas passage means.

13. A converter as set forth in claim 12 including a bypass flow conduit opening into one of said gas passage means.

14. A converter as set forth in claim 12 including means securing said oval shell to said housing at one end only to provide for dimensional changes due to thermal differentials of the shell transversely and along its length with respect to the housing.

15. A converter as set forth in claim 14 including a longitudinally extending support for the outlet wall located in and secured to said shell in said major part of said outlet gas passage means, said outlet wall being movable relative to said support, said support being shaped to guide gas flowing in said outlet gas passage means.

16. A catalyst converter for engine exhaust gases comprising an oval outer housing having inlet means and outlet means for a gas stream to be treated, catalyst bed means providing a catalyst bed in said housing and having a perforate inlet wall and a perforate outlet wall, gas to be treated flowing from the inlet wall to the outlet wall through the catalyst bed, inlet gas passage means in the housing for passage of gas from said inlet means to said inlet wall, outlet gas passage means in the housing for passage of gas from said outlet wall to said outlet means, said bed being shaped as a curved segment extending across substantially the entire major diameter of said oval housing and the inlet and outlet walls thereof both being curved to present convex curvature to gas impinging on them from the inlet gas passage means and the catalyst bed respectively, the inlet and outlet walls being substantially concentric with a portion of said housing adjacent the inlet wall, there being a longitudinal space between said inlet wall and said housing portion and said space forming a major part of said inlet passage means, fin means associated with said housing portion and extending into said longitudinal space and providing means tending to equalize flow from the inlet passage means through the inlet wall, one curved half of each of said walls having a patch of louvers formed therein facing in one direction and the other curved half of each of said walls having a patch of louvers formed therein facing in the opposite direction.

17. A converter as set forth in claim 16 including a flow guiding and equalization member located in said outlet gas passage means.

18. A downflow catalyst converter for engine exhaust gases comprising a tubular outer housing having inlet means at one end and outlet means at the other end for a gas stream to be treated in the converter, an inner tubular housing separate from and inside of said outer housing and having one side closely adjacent to the inside of the outer housing along the length of the inner housing, means forming a downflow catalyst bed inside said inner housing, said catalyst bed having a perforate outlet wall extending transversely across and opening inside of said inner housing, a portion of said inner housing beign perforate and said portion forming an inlet wall for said catalyst bed, said catalyst bed having a transverse length that is only segmental with respect to the perimeter of said inner housing, outer gas passage means inside said outer housing and outside said inner housing connecting said inlet wall to said inlet means, said outlet means opening into said inner housing, and inner gas passage means inside the inner housing connecting said outlet wall to said outlet means.

19. A catalyst converter as set forth in claim 18 including means fixing the inner housing to the outer housing at one end only so that the housings can move longitudinally relative to each other.

20. A catalyst converter as set forth in claim 19 including means fixing said catalyst bed outlet wall at one end only to said inner housing so that said outlet wall can move longitudinally relative to the inner housing.

21. A catalyst converter for engine exhaust gases comprising a tubular outer housing having inlet means at one end and outlet means at the other end for a gas stream to be treated in the converter, an inner tubular housing separate from and inside of said outer housing, means forming a catalyst bed inside said inner housing, said catalyst bed having a perforate outlet wall opening inside of said inner housing, a portion of said inner housing being perforate and said portion forming an inlet wall for said catalyst bed, outer gas passage means inside said outer housing and outside said inner housing connecting said inlet wall to said inlet means, said outlet means opening into said inner housing, inner gas passage means inside the inner housing connecting said outlet wall to said outlet means, and means supporting said catalyst bed outlet wall on said inner housing so that said outlet wall can move longitudinally and transversely relative to the inner housing and said inlet wall.

22. A catalyst converter as set forth in claim 21 wherein said outer wall supporting means comprises an outlet wall support member in said inner gas passage means of said inner housing and movably engaging said outlet wall.

23. A catalyst converter as set forth in claim 22 wherein said support member is shaped to guide flow in said outlet passage.

24. A catalyst converter as set forth in claim 23 wherein said outlet wall comprises a perforate grid plate and said supporting means includes a lip mounted on said inner housing and receiving one end of said plate.

25. A catalyst converter as set forth in claim 24 wherein said supporting means also includes retainer strips secured to said inner housing and providing grooves receiving side edges of said plate.

26. A catalyst converter as set forth in claim 25 wherein said plate has curved side edges and said housing has curved portions engaged by and supporting said curved side edges.

27. A catalyst converter as set forth in claim 26 wherein said inlet and outlet walls are both convexly curved with respect to the direction of gas flow through the bed.

28. A catalyst converter for engine exhaust gases comprising a tubular outer housing having inlet means at one end and outlet means at the other end for a gas stream to be treated in the converter, an inner tubular housing separate from and inside of said outer housing, means forming a catalyst bed inside said inner housing, said catalyst bed having a perforate outlet wall opening inside of said inner housing, a portion of said inner housing being perforate and said portion forming an inlet wall for said catalyst bed, outer gas passage means inside said outer housing and outside said inner housing connecting said inlet wall to said inlet means, said outlet means opening into said inner housing, and inner gas passage means inside the inner housing connecting said outlet wall to said outlet meas, said inlet wall being curved and convex to gas entering the bed and the outer wall being curved and convex to gas leaving the bed, said outlet wall having inturned and shaped longitudinal side edges fitting upon and supported upon inside surfaces of said inner housing to maintain a substantially predetermined spacing between said walls along the length of said outlet wall.

29. A catalyst converter for engine exhaust gas comprising an elongated tubular housing having an inlet header closing one end and an outlet header closing the other end, an elongated tubular shell inside the housing and having an inlet end partition closing one end and an outlet end partition closing the other end, there being a space in said housing outside said shell and extending along substantially the full length of one side of said shell and said space comprising an inlet flow chamber, the other side of said shell being closely adjacent to the inside of the housing along substantially the full length thereof, said inlet header having inlet means opening into said inlet flow chamber, a longitudinally extending partition inside said shell and arranged to be substantially parallel to said one side of said shell, means securing said partition to said shell so that the space between said partition and said one side forms a downflow catalyst bed chamber, said one side and said partition being perforated to provide for gas flow from said inlet flow chamber through said catalyst bed chamber, there being a space inside said shell outside of said catalyst bed chamber and extending along substantially the full length of the shell and said space comprising an outlet flow chamber for gas passing through the bed chamber, said outlet header and said outlet end partition having outlet means opening into said outlet flow chamber.

30. A converter as set forth in claim 29 including catalyst bed chamber bypass means comprising a bypass opening in one of said headers and passage means connecting said bypass opening with one of said flow chambers.

References Cited
UNITED STATES PATENTS

| | | | |
|---|---|---|---|
| 3,110,300 | 11/1963 | Brown et al. | 23—288 F X |
| 3,154,388 | 10/1964 | Purse | 23—288 F |
| 3,180,712 | 4/1965 | Hamblin | 23—288 F |
| 3,201,207 | 8/1965 | Lentz | 23—288 F |
| 3,252,767 | 5/1966 | Lentz | 23—288 F |
| 3,434,806 | 3/1969 | De Rycke et al. | 23—288 F |
| 3,479,145 | 11/1969 | Lentz | 23—288 F |
| 3,600,142 | 8/1971 | Fessler | 23—288 F |
| 3,649,214 | 3/1972 | Henriksson et al. | 23—288 F |
| 3,695,851 | 10/1972 | Perga | 23—288 F |
| 3,733,181 | 5/1973 | Tourtellotte et al. | 23—288 F |

FOREIGN PATENTS

| | | | |
|---|---|---|---|
| 644,734 | 5/1937 | Germany | 23—288 F |

BARRY S. RICHMAN, Primary Examiner

U.S. Cl. X.R.

60—288, 299